United States Patent Office.

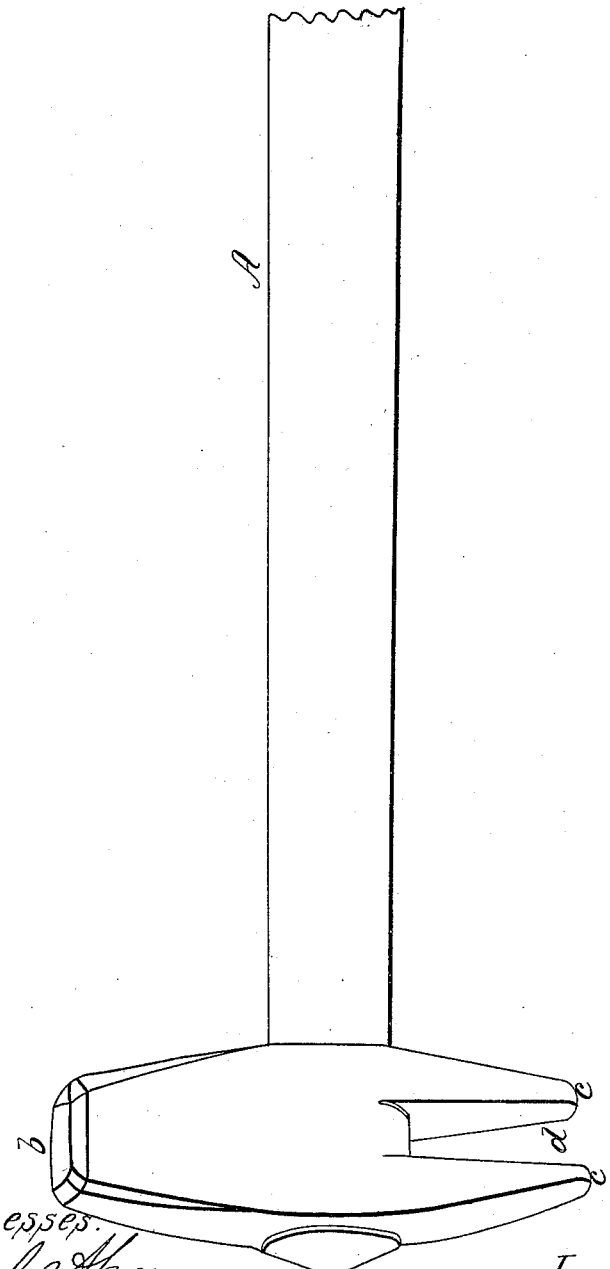

JAMES CONNOLLY, OF NEWBURG, NEW YORK.

Letters Patent No. 63,474, dated April 2, 1867.

---

IMPROVED TOOL FOR UPSETTING FLANGES.

---

*The Schedule referred to in these Letters Patent and making part of the same.*

---

Be it known that I, JAMES CONNOLLY, of the city of Newburg, in the county of Orange, and State of New York, have invented a new and useful Tool for Upsetting Flanges; and I do hereby declare that the following is a full, clear, and exact description of the construction and operation of the same, reference being had to the drawing accompanying this application.

In the accompanying drawing, $a$ represents the handle, which is usually of the length of thirty inches, and is made of iron. $b$, head of the tool to receive the blows of the striker when upsetting flanges. $c$, jaws to hold the iron together while upsetting, regulate the thickness of the flanges, and prevent the iron from splitting or breaking, usually of length of from one inch to inch and three-eighths. $d$, opening in which the edge of the iron to be upset is inserted. The hammer $b$ and jaws $c$ to be made of cast steel, and of sufficient size to secure the desired strength, and the size is also to be regulated by the thickness of the iron to be worked. In working flue holes of boilers the jaws should be narrow at the tops and rounding, as per accompanying drawing No. 1. In doing straight work the jaws may be square at the tops, and wider.

The manner of using the tool is thus: When the iron is taken from the fire, properly heated, one man takes hold of the handle, places the jaws across the edge of the iron to be worked or upset, and keeps moving the tool according to the shape the flanges are to be made, and at the same time one or two men strike with hammers upon the hammer portion of this tool. In flanging flue holes the person at the handle of the tool leans down a little upon it, so as to give the iron the proper bend.

I hereby claim that by the use of this tool the upsetting may be done with much more facility than by any other method, that the tool keeps the iron together and makes the flange of uniform thickness. By upsetting in accordance with the old method, the grain of the iron is opened, and uniform thickness cannot be obtained. Good flanges and work may be done by the use of this tool with iron of an inferior quality, and which cannot well be used for boiler purposes without it. Unless the flanges are well made, boilers will always be imperfect. By using this tool any kind of angles may be made perfectly, which cannot be done by any other method; greater strength of work is secured, a better finish, and more safety.

What I claim as my invention, and desire to secure by Letters Patent, is—

The tool aforesaid for flanging as above described, and which will produce the intended effect.

JAMES CONNOLLY.

Witnesses:
DANIEL AHERN,
ABRAM S. CASSEDY.